United States Patent [19]

Holstein

[11] 4,189,840
[45] Feb. 26, 1980

[54] SCANNING UNIT

[75] Inventor: Siegbert Holstein, Stein a.d. Trun, Fed. Rep. of Germany

[73] Assignee: Dr. Johannes Heidenhain GmbH, Traunreut, Fed. Rep. of Germany

[21] Appl. No.: 873,053

[22] Filed: Jan. 27, 1978

[30] Foreign Application Priority Data

Feb. 18, 1977 [DE] Fed. Rep. of Germany ....... 2706926

[51] Int. Cl.² ............................................. G01B 11/04
[52] U.S. Cl. .................................. 33/125 C; 356/373
[58] Field of Search ......... 308/6 R; 33/125 R, 125 A, 33/125 C; 356/169, 170, 373, 372; 250/237 G

[56] References Cited
U.S. PATENT DOCUMENTS 2,936,524  5/1960  Shaffer ................................ 308/6 R

FOREIGN PATENT DOCUMENTS 2505586  8/1976  Fed. Rep. of Germany ........ 33/125 C
7620153 10/1976  Fed. Rep. of Germany ........ 33/125 C
190639  12/1922  United Kingdom .................... 308/6 R Primary Examiner—John W. Shepperd
Attorney, Agent, or Firm—Hume, Clement, Brinks, Willian & Olds

[57] ABSTRACT

A scanning unit is provided which is adapted for translation in a longitudinal direction along three guide surfaces defined by a length measuring device. The preferred embodiment of this scanning unit includes at least one set of bearings which is adapted to contact each of the three guide surfaces. Each set of bearings includes two bearings which are arranged in tandem along the longitudinal direction such that the separation between the two bearings in each set is greater than the anticipated longitudinal width of irregularities and gaps associated with joints in the guide surfaces.

6 Claims, 2 Drawing Figures

SCANNING UNIT

BACKGROUND OF THE INVENTION

This invention relates to a measuring device and more particularly to an improved scanning unit for use with a digital length measuring device.

Digital length measuring devices are in widespread use today. One form of these measuring devices is described in German Publication Copy DT-OS 25 05 586, and includes a scanning unit which is connected to the object being measured. This scanning unit moves along an indexed scale and includes apparatus for measuring the position of the scanning unit along the scale. Movement of the object causes the scanning unit to move along the scale, and the position of the object being measured can be determined by measuring the position of the scanning unit. An auxilliary guide means is provided to position the scanning unit in two dimensions perpendicular to the direction of measurement. The scanning unit itself includes a plurality of guide bearings which bear on guide surfaces defined by the guide means.

One scanning unit known to the prior art is described in West German Gebrauchsmuster GM 76 20 153. This scanning unit includes three sets of guide bearings which serve to position the scanning unit with respect to three guide surfaces defined by the auxilliary guide means. The first set of guide bearings includes three bearings arranged in a triangle which bear on the first guide surface. The second set of guide bearings includes two bearings arranged in a line which bear on the second guide surface, transverse to the first guide surface. The third set of guide bearings includes a single bearing which is resiliently positioned on a third guide surface placed obliquely opposite the first and second guide planes. The resilient contact between this single bearing and the third guide surface provides a positioning force which urges the first and second sets of bearings against the first and second guide surfaces, respectively.

Scanning units such as those described above exhibit certain disadvantages. In many applications these scanning units introduce measurement errors when irregularities in one or more of the three guide surfaces are encountered. In particular, it is often desirable to construct the auxiliary guide means from several separate lengths of a housing profile which are joined together. The joints between adjacent lengths of housing profiles often introduce irregularities in one or more of the guide surfaces which may introduce measurement errors when a scanning unit of the prior art traverses these joints. Such errors may represent a significant drawback in certain high precision measuring devices.

The present invention is directed to an improved scanning unit which is capable of traversing joints in the guide means with reduced susceptibility to measurement error.

SUMMARY OF THE INVENTION

The improved scanning unit of this invention provides at least two guide bearings at a bearing location in the scanning unit which are spaced longitudinally from each other along the direction of measurement. The total longitudinal separation between the bearings of this one bearing location is greater than the width of a joint in the guide surfaces. A scanning unit having double roller bearings at each bearing location has been shown to be particularly advantageous in many applications. However, designs with multiple sliding rails, multiple magnetic bearings, multiple pneumatic bearings, and the like also are possible. The invention, together with further objects and attendant advantages, will be best understood by reference to the following description taken in connection with the accompanying drawings.

BRIEF DESCRIPTION OF THE DRAWINGS

The drawing represents one embodiment of the scanning unit of this invention, by way of an example.

DETAILED DESCRIPTION OF A PREFERRED EMBODIMENT

Figure 1:
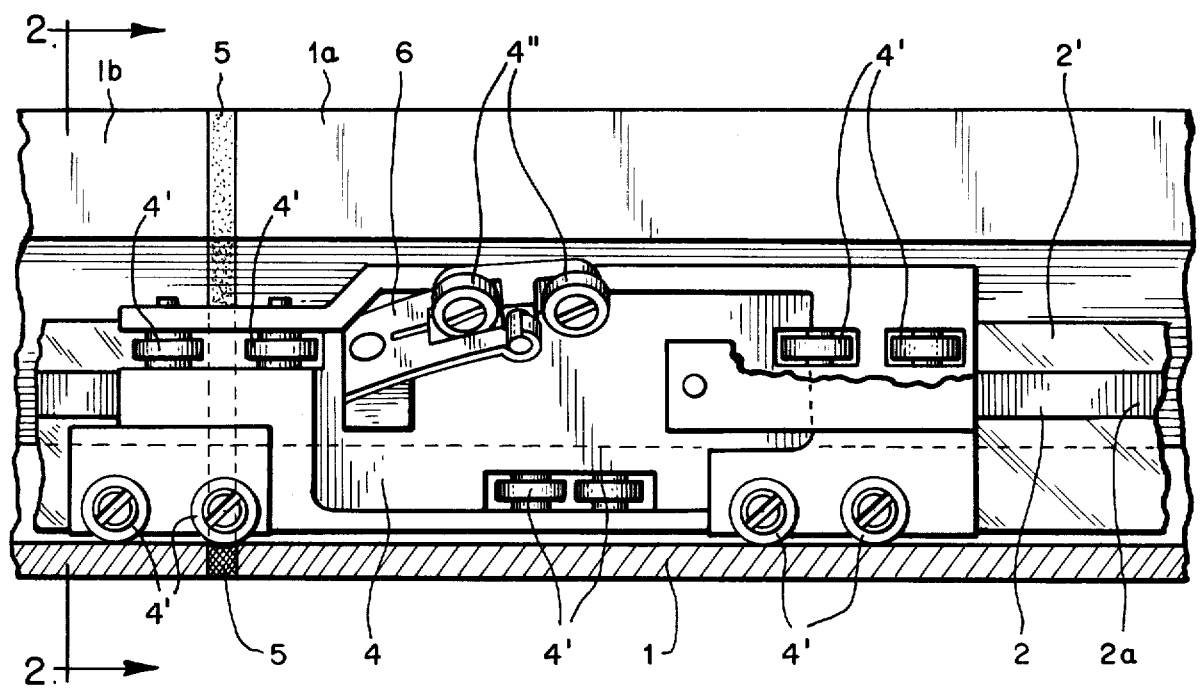
FIG. 1 is a simplified representation of a sectional view of a length measuring device including one preferred embodiment of the scanning unit of this invention.
Figure 2:
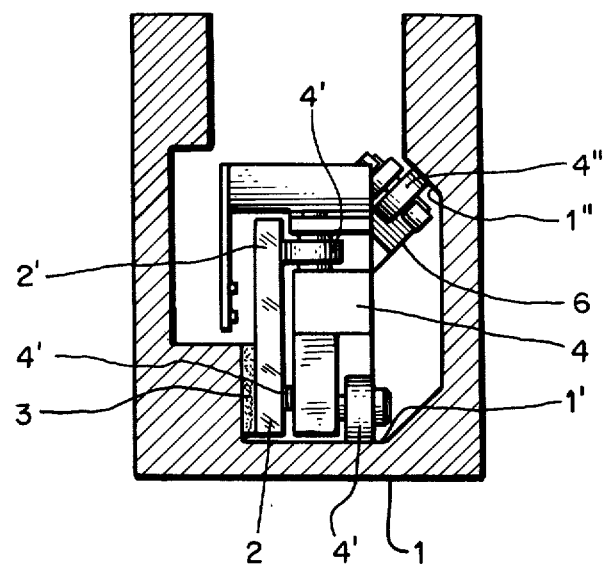
FIG. 2 is a sectional view taken along line II—II through the measuring device of FIG. 1.

Referring now to FIG. 1, a portion of a length measuring device is shown including one embodiment of the scanning unit of this invention. The measuring device includes a hollow guide member and housing indicated generally by the reference numeral 1. This guide member, which may be fabricated from extruded aluminum, serves to guide the movement of a scanning unit 4 and also acts as a housing for the scanning unit 4 and a measuring scale 2. The measuring scale member 2 is secured to the interior of the guide member 1 by a highly elastic layer 3 and the scale member 2 includes an array of reference marks which form a grid scale 2a. The scanning unit 4 includes measurement means, not shown, for measuring the position of the scanning unit 4 along the scale member 2. These measurement means may comprise a grid scanning plate, illuminating elements, and photodetectors which operate to count reference marks of the grid scale 2a. The scanning unit 4 is coupled by coupling means, not shown, to the object whose position is to be measured, and the guide member 1 is secured to a stationary member (not shown). For example, the scanning unit 4 and the guide member 1 may be secured to the carriage and the bed, respectively, of a machine tool. In this case movement of the carriage with respect to the bed causes the scanning unit 4 to move with respect to the guide member 1 and the scale member 2. Since the above-referenced coupling means and measurement means do not contribute in any way toward the elucidation of the invention, these elements of the measuring device are not shown in the drawings.

The scanning unit 4 is positioned by three guide surfaces 1', 1" and 2'. The guide surfaces 1' and 1" are defined by interior surfaces of the guide member 1. The third guide surface 2' is located directly on the scale member 2, that is, practically in the same plane as the grid scale 2a. Difficulties often arise for measuring devices of the described design in case of large measuring lengths, because the guide member 1 is often assembled from separate guide members 1a and 1b. Joints 5, which have a predetermined maximum width along the measuring direction, are situated between adjacent guide members 1a and 1b. These joints 5 have repeatedly provided a source of measurement error. Even when the guide members are carefully assembled and seals or the like are used, gaps are often produced at the joint 5.

The scanning unit 4 has at each bearing location a set of two ball bearings arranged in tandem, one behind the other. In each of the tandem bearings the separation between the two bearings in the measuring direction is greater than the predetermined maximum width of the joints 5. This separation insures that the two bearings of a single tandem set do not simultaneously traverse a joint 5. Five sets of ball bearings 4' are secured to the scanning unit 4 as shown. Three sets of bearings 4' bear on the guide surface 2' and two sets 4' bear on the guide surface 1'. An additional set of two ball bearings 4" is mounted in a rocker-like fashion on the scanning unit 4. The bearings 4" are mounted on a slotted leaf spring 6 for angular movement. The particular advantages of such a leaf spring mounting are presented in the German Gebrauchsmuster GM 76 20 153 which utilizes only a single roller bearing rather than the double ball bearing of this embodiment. When the scanning unit 4 is assembled in the guide member 1, the bearings 4' are self-aligning at the guide surface 1" and in this position are fixed by cement. Angular mobility is provided by the slotted spring 6. As a result of the double roller bearing 4" at this bearing point, the scanning unit 4 traverses the joint 5 in the guide member 1 with reduced disturbance while the resilient contact effect is fully maintained.

The adverse effect associated with the joint 5 can be reduced further by staggering the bearigs associated with one guiding surface with respect to the bearings associated with another guide surface, as shown in FIG. 1.

Of course, it should be understood that various changes and modifications to the preferred embodiment described herein will be apparent to those skilled in the art. Various types of bearings and bearing arrangements can be used, for example. Such changes and modifications can be made without departing from the spirit and scope of the present invention and without diminishing its attendant advantages. It is, therefore, intended that such changes and modifications be covered by the following claims.

I claim:

1. In a scanning unit for use in a length measuring device wherein the scanning unit is adapted to translate along a measuring scale in a longitudinal direction guided by a plurality of guide surfaces defined by the measuring device, said guide surface including a first guide surface having at least one joint defining a depression having a predetermined maximum width in the longitudinal direction, said scanning unit including a plurality of longitudinally spaced bearing locations which operate to position the scanning unit with respect to the first guide surface, the improvement comprising:
   at least two bearings included in each of said bearing locations, wherein each bearing is mounted in a substantially fixed position with respect to the scanning unit such that, for each bearing location, each of the bearings independently operates to precisely support and position the scanning unit from the first guide surface in the absence of support from other bearings of that bearing location, and further, wherein the bearings of each bearing location are separated in the longitudinal direction by a spacing which is greater than the predetermined maximum width of the depression in the longitudinal direction; and
   means for urging the scanning unit toward the first guide surface such that the bearings included in said bearing locations are urged against the first guide surface.

2. The scanning unit of claim 1 wherein the bearings are further characterized as roller bearings.

3. The scanning unit of claim 1 wherein the bearings of each bearing location are arranged in tandem along a line substantially in the longitudinal direction.

4. A scanning unit for use in a measuring device wherein the scanning unit is adapted to translate along a measuring scale in a longitudinal direction along first, second, and third guide surfaces, said first and second guide surfaces each having at least one joint forming a depression of a predetermined maximum width in the longitudinal direction, wherein the scanning unit comprises:
   a plurality of longitudinally spaced first tandem bearing sets coupled to the scanning unit and arranged to position the scanning unit with respect to the first guide surface, each of said first tandem bearing sets including two bearings arranged along a line substantially parallel to the longitudinal direction, wherein the separation in the longitudinal direction between the two bearings in each of said first tandem bearing sets is greater than the predetermined maximum width of the depression and, further, wherein each of the bearings in each of said first tandem bearing sets is mounted in a substantially fixed position with respect to the scanning unit such that each of the bearings in each of said first tandem bearing sets independently operates to precisely support and position the scanning unit with respect to the first guide surface in the absence of support from the other bearing in the respective first tandem bearing set;
   spring means having a first end section mounted to the scanning unit and a second end section, spaced from the scanning unit;
   a second tandem bearing set mounted to the second end section of the spring means and arranged to position the scanning unit with respect to the second guide surface, said second tandem bearing set including two bearings arranged along a line substantially parallel to the longitudinal direction, wherein the separation in the longitudinal direction between the two bearings in each of said second tandem bearing sets is greater than the predetermined maximum width of the depression, and further, wherein the bearings of the second tandem bearing set are fixedly mounted with respect to the second end section of the spring means such that each of the bearings of said second tandem bearing set operates to support the scanning unit against the second guide surface independently of the other bearing in the second tandem bearing set; and
   means for positioning the scanning unit with respect to the third guide surface.

5. In a scanning unit for use in a length measuring device, wherein the scanning unit is adapted to translate along a measuring scale in a longitudinal direction guided by a plurality of guide surfaces defined by the measuring device, said guide surfaces including a first guide surface having at least one joint defining a depression having a predetermined maximum width in the longitudinal direction, and said scanning unit including a plurality of longitudinally spaced bearing locations which operate to position the scanning unit with respect to the first guide surface, the improvement comprising:

at least two bearings included in each bearing location, wherein the bearings of each bearing location are arranged in tandem along a line substantially in the longitudinal direction, wherein the bearings of each bearing location are separated in the longitudinal direction by a spacing which is greater in the longitudinal direction than the predetermined maximum width of the depression in the longitudinal direction, and substantially less than the length of the scanning unit, and wherein the bearings are mounted in a substantially fixed position with respect to the scanning unit such that each of the bearings of each bearing location precisely positions the scanning unit with respect to the first guide surface independently of every other bearing of that bearing location; and means for urging the scanning unit toward the first guide surface such that the bearings included in said bearing locations are urged against the first guide surface.

6. A scanning apparatus for a length measuring device, wherein the scanning apparatus is guided along a measuring scale in a longitudinal direction by a plurality of guide surfaces defined by the measuring device, said guide surfaces including a first guide surface having at least one joint defining a depression having a predetermined maximum width in the longitudinal direction, said scanning apparatus comprising:

a scanning unit;

a plurality of longitudinally spaced sets of paired bearings mounted on the scanning unit to contact said first guide surface, each set including two bearings separated in the longitudinal direction by a distance greater than the maximum width of the depression but substantially less than the length of the scanning unit, each bearing of each set of bearings mounted to support and position the scanning unit independently of the other bearing of each set; and means for urging the scanning unit toward the first guide surface such that the bearings included in said sets of paired bearings are urged against the first guide surface.

* * * * *